Jan. 24, 1956
N. NEBOUT
2,731,666
MACHINE FOR EXTRACTING VULCANIZATION
BAGS FROM PNEUMATIC TIRES
Filed Sept. 8, 1953
6 Sheets-Sheet 1
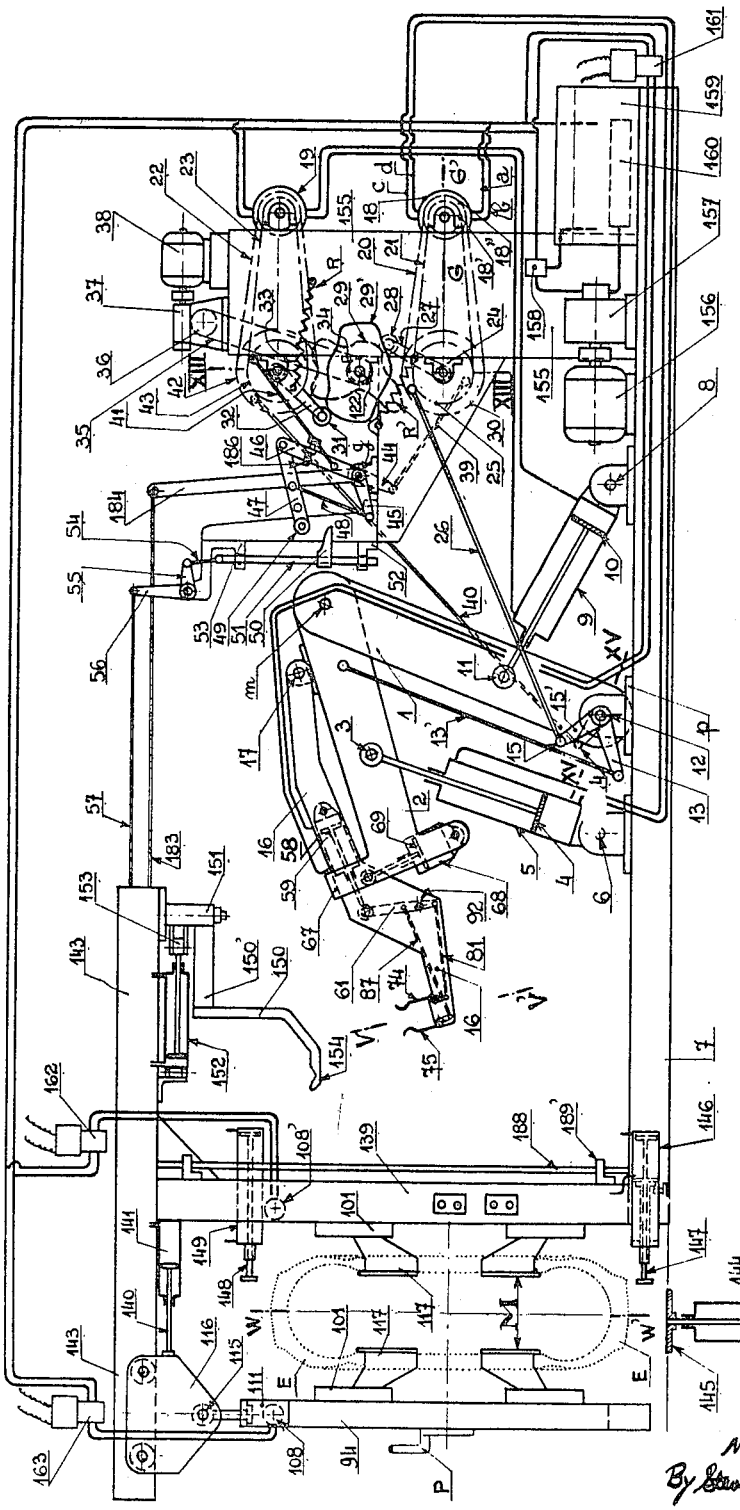
Fig: 1
INVENTOR
Noël Nebout
By Stevens, Davis, Miller & Mosher
ATTORNEYS

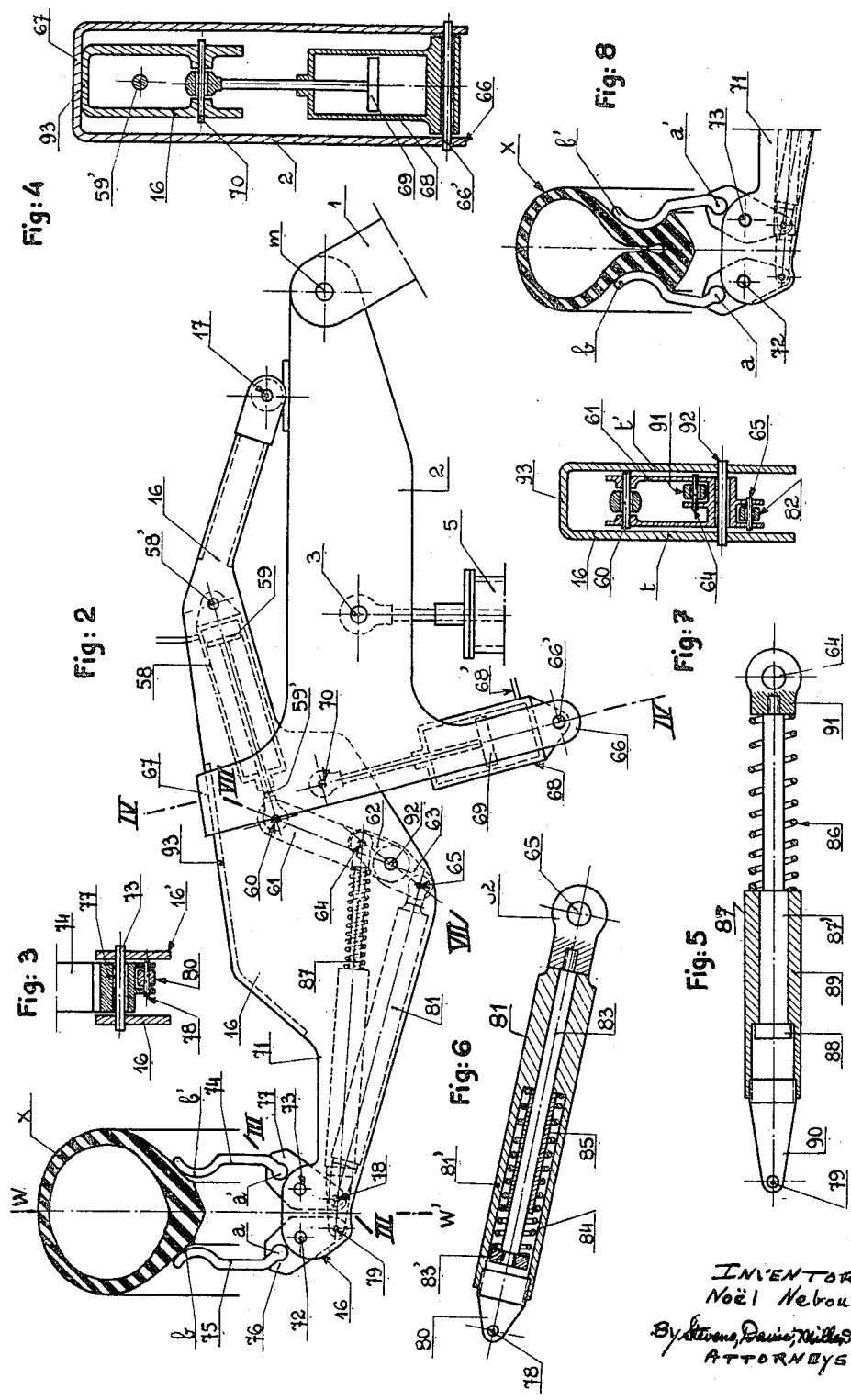

Jan. 24, 1956
N. NEBOUT
2,731,666
MACHINE FOR EXTRACTING VULCANIZATION
BAGS FROM PNEUMATIC TIRES
Filed Sept. 8, 1953
6 Sheets-Sheet 3
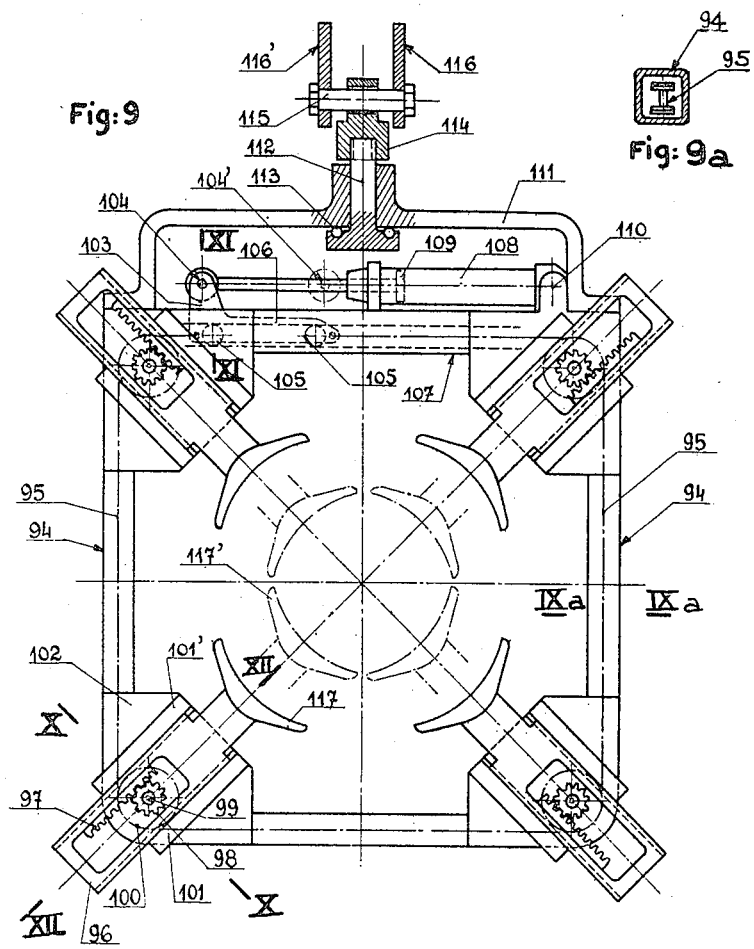
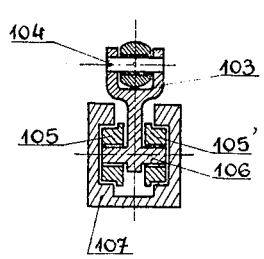
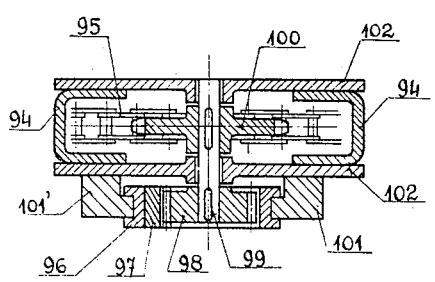
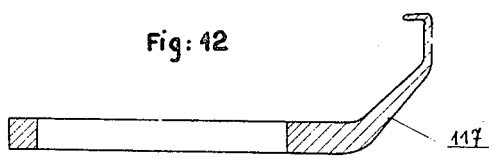
INVENTOR
Noël Nebout
By Stevens, Davis, Miller Mosher
ATTORNEYS

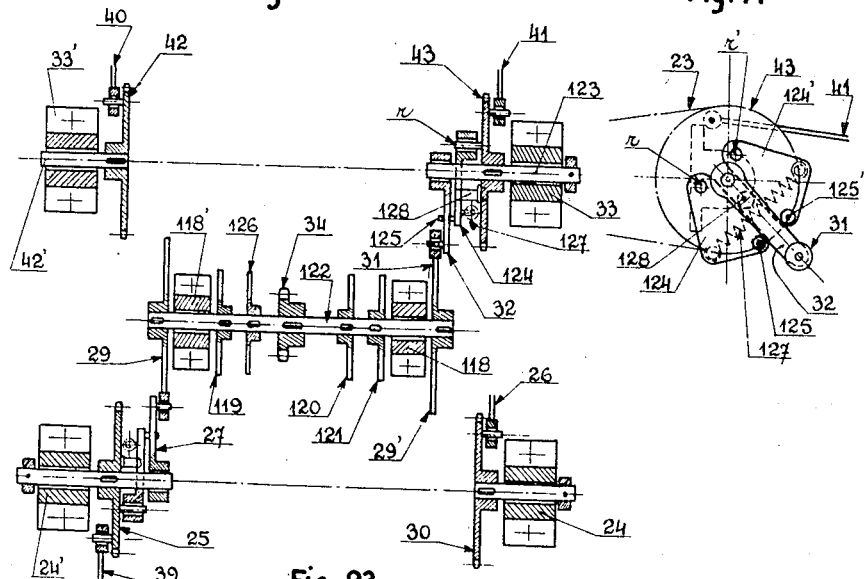
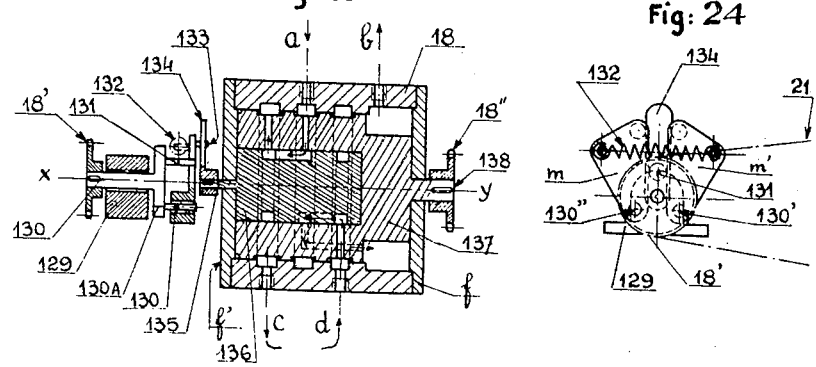
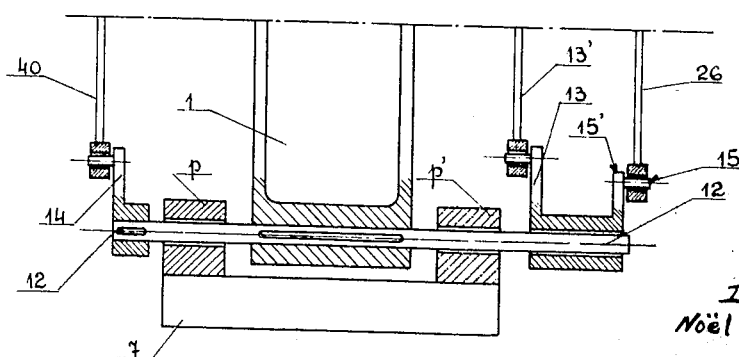

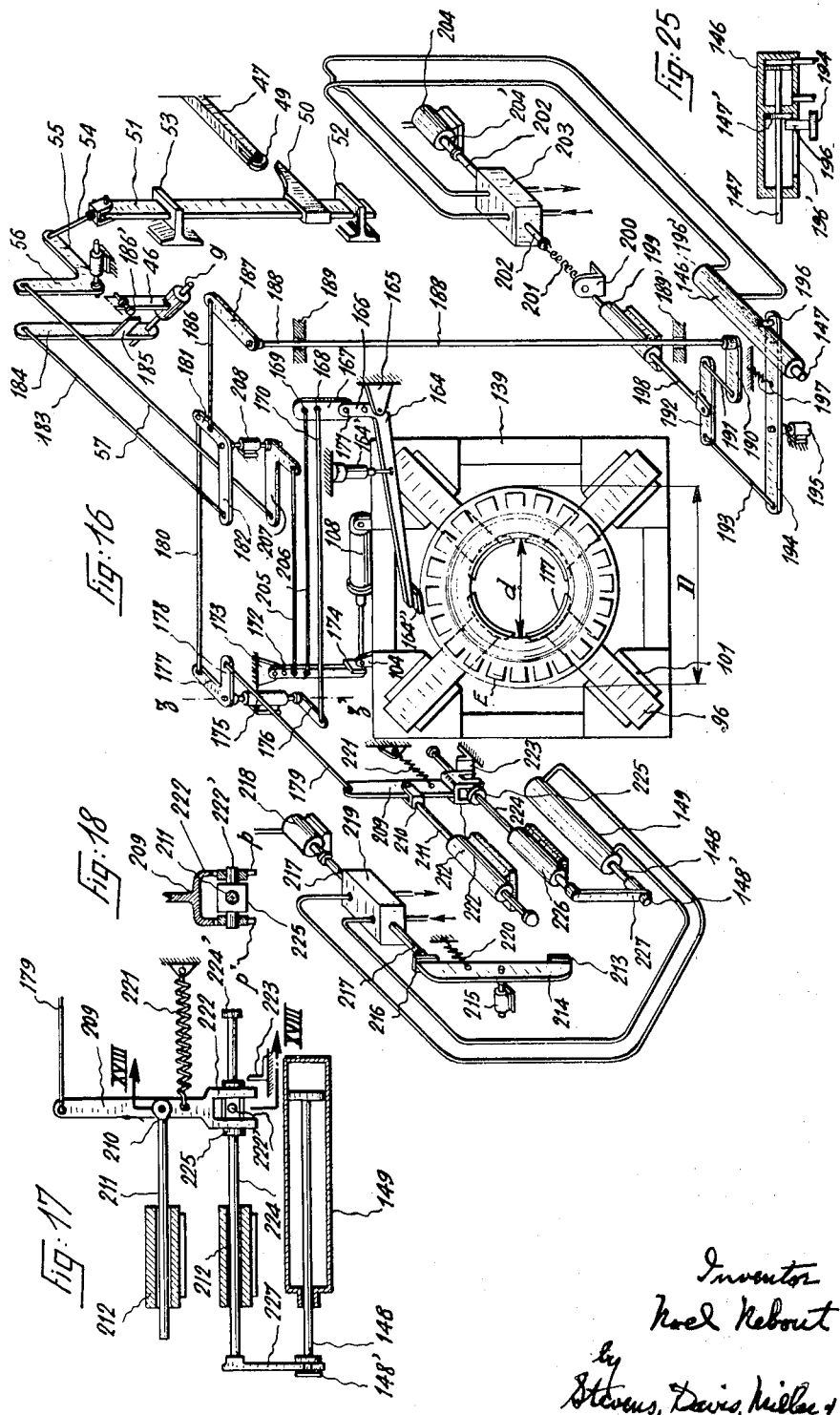

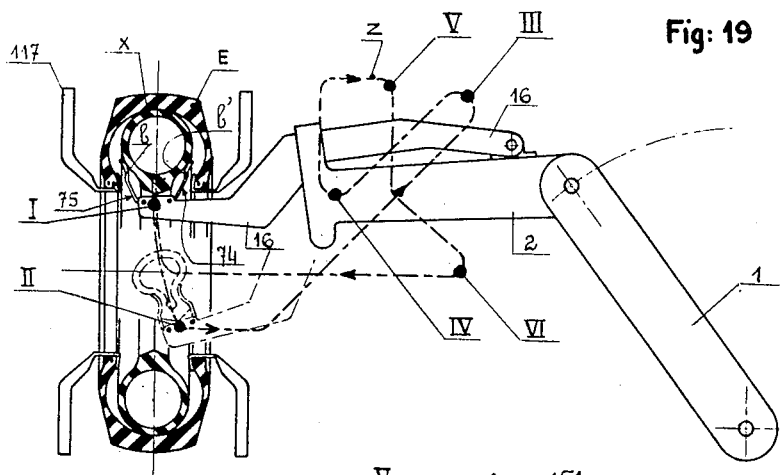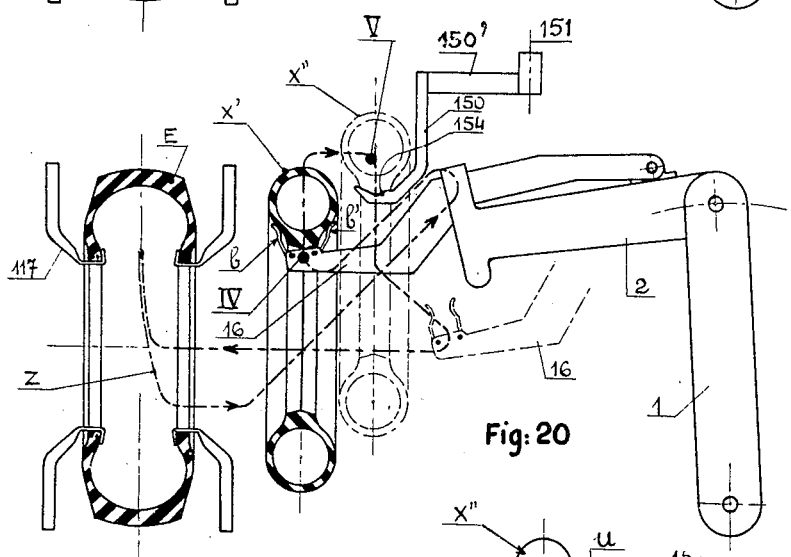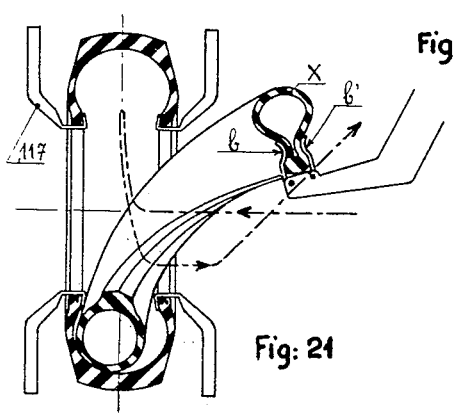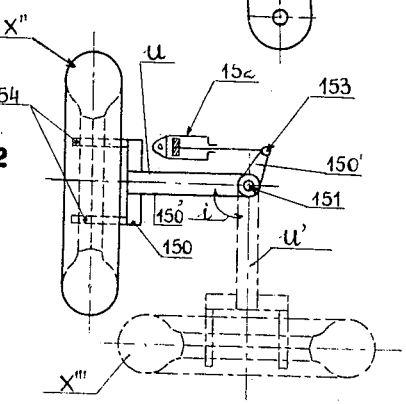

United States Patent Office 2,731,666
Patented Jan. 24, 1956

2,731,666
MACHINE FOR EXTRACTING VULCANIZATION BAGS FROM PNEUMATIC TIRES

Noël Nebout, Montlucon, France, assignor of one-half to Societe Anonyme des Pneumatiques Dunlop, Paris, France, a French company Application September 8, 1953, Serial No. 378,991
Claims priority, application France June 10, 1953
11 Claims. (Cl. 18—2)

The object of the present invention is to provide a machine intended to extract vulcanising or heat-treatment bags. These bags are a kind of large rubber tube of ring shape which are kept inflated inside pneumatic rubber tyres during their vulcanisation.

Up to the present time, the methods used in carrying out this operation had the effect of damaging to a more or less great extent both the heat-treatment bags and even the tyres, since the movements and the paths followed by the various portions of the bags as they were taken out of the tyre were not at all appropriate. It has, in fact, been found that the best path or trajectory is not the same for tyres having small rim diameters as for large rim diameters or again for small cross-section types or those of large cross-section.

The method and the machine which are the object of the present invention overcome this difficulty.

In accordance with the invention, the trajectory of the jaws which grip the heat treatment bag inside the rubber tyre is automatically modified as a function of the characteristic dimensions of the tyre and mainly of those of the internal diameter (that is to say, of the rim) and of the external diameter. This trajectory is such that it enables that portion which is being pulled out to be moved in the mean "equatorial" plane of the tyre as far as the portion opposite the free ends of the tyre.

A basic feature of the invention is that the complex path traced by the jaws which grip the bag results from the combined effect of the movement of two levers rotating about axes, which may for example, be horizontal, and which constitute a kind of mechanical arm. The first lever is pivoted to a fixed frame and the second lever is pivotally mounted on the end of the first. Each of these levers is controlled by an independent driving member of any kind: electric, pneumatic, hydraulic, etc. With the assembly composed of these two driving levers described above, there corresponds another assembly which is usually smaller but which is made up of two levers arranged in the same way and which are called guiding levers. Each lever of the driving assembly always remains approximately parallel to the corresponding lever of the guiding assembly. Connections are established between the two lever assemblies, in such a way that the small angular displacement existing between two conjugate levers corresponding to the two assemblies, enables the distribution of the driving force to be regulated, which controls each of the levers of the driving assembly. In other words, each lever of the driving assembly is controlled by the corresponding lever of the guiding assembly. The result of this is that a given trajectory of the extremity of the last lever of the guiding assembly corresponds to a certain trajectory of the extremity of the last lever of the driving assembly. A movement of any kind may be imparted to the driving assembly, by using a force as great as may be desired, acting in any particular direction in the plane described by the extremity of the last lever. This result may be obtained by applying very small force to the levers of the guiding assembly, so that the effect required may be provided manually or by means of control members of any kind suitable for operation by small working forces, such as cams or templates of thin material. It is possible to record the movements of each of the levers of the guiding assembly and then to use these recording to control and produce the movements of each of the levers of the driving assembly. It is possible to carry out, by means of the driving assembly, cycles of extraction for bags of rubber tyres, by having them guided by an operator who carries out manually on the assembly of the guiding levers the movements which he considers suitable. When the operation thus carried out manually is considered to be satisfactory, these movements of the levers of the guiding assembly are then recorded. The driving assembly may thereafter reproduce the movements recorded indefinitely.

A further feature of the present invention is to enable trajectories to be modified as a result of casual and variable external circumstances, such as, for example, the presentation in an unknown order of tyres of different sizes. To this end, the measurement of the internal diameter of the rim and of the external diameter causes certain stop members to be displaced, these stop members serving to limit at the correct moment, the travel of the guiding levers, which has for its result to produce the same limitation of movement on the levers of the driving assembly. In this way, the machine itself modifies its own behaviour when dealing with tyres of different shapes.

The connections between the assemblies of the driving levers may be effected by mechanical or by electrical means, for example by means of potentiometers or of synchronous machines (selsyns), the use of which is well known, such as the tele-indicator or by any other means whatever.

A further feature of the invention resides in the means employed to grip the heat-treatment bag inside the tyre. There are used for this purpose hinged jaws arranged in such a way as to exert very low force when opening and very powerful efforts when closing. The use of jaws to grip the heat-treatment bags and to withdraw them from a pneumatic tyre is known, but the jaws used up to the present time were not designed to produce very small reactions at the points of contact at the moment when they are inserted in the tyre to grip the bag, and these small reactions apply equally well to the effect on the bag as on the tyre itself. The gripping jaws of the machine, which is the object of the present invention, may be inserted between the internal walls of the tyre and the bag, opening automatically to an extent which is variable as a function of the size of the bag, whilst only small forces are exerted, thus involving no risk of damaging in any way the parts in contact. This feature of the invention is important. It may be added that the jaws are easily dismantled, which enables them to be replaced very rapidly by jaws of a different shape, if such are required.

When it is intended to withdraw the heat-treatment bag from the tyre, the beads or edges of the latter must be held apart (in the vicinity of the wires).

A feature of the invention is that it enables the edges of the tyre to be opened out to a variable extent as a function of the characteristic dimensions of the tyre referred to above; in other words, the edges of a tyre of large section are opened out more widely than those of a small tyre. The measurement of the diameters and the opening-out operation which results, are carried out automatically. This arrangement enables a passage to be left wide enough for the removal of large heat-treatment bags and also for the smallest bags without applying to the edges of the tyre any force which is likely either to damage them or to deform them excessively.

Finally, a further feature of the invention enables the bags to be conveniently removed after their extraction, which effects an economy in personnel. To this end, the device which has gripped the bag inside the tyre carries it away and places it on a movable support.

The description which follows below with respect to the attached drawings (which are given by way of example only and not in any sense by way of limitation) will make it quite clear how the invention may be carried into effect, the special features which are referred to, either in the drawings or in the text, being understood to form a part of the said invention.

Fig. 1 is a view in elevation of the complete machine.

Fig. 2 is a view in elevation of the arms which carry the gripping jaws.

Fig. 3 is a cross-section along the line III—III of Fig. 2.

Fig. 4 is a cross-section along the line IV—IV of Fig. 2.

Figs. 5 and 6 are views in cross-section of the crank-arms which control the jaws.

Fig. 7 is a cross-section along the line VII—VII of Fig. 2.

Fig. 8 is a view in elevation of the jaws gripping the heat-treatment bag.

Fig. 9 is a view in elevation of the movable frame which opens out the edges of the tyres.

Fig. 9a is a cross-section along the line IXa—IXa of Fig. 9.

Fig. 10 is a cross-section along the line X—X of Fig. 9.

Fig. 11 is a cross-section along the line XI—XI of Fig. 9.

Fig. 12 is a cross-section along the line XII—XII of Fig. 9.

Fig. 13 is a cross-section along the line XIII—XIII of Fig. 1.

Fig. 14 is a view in elevation of a portion of Fig. 13.

Fig. 15 is a cross-section through XV—XV of Fig. 1.

Fig. 16 is a perspective view of the device which holds apart the edges of the tyre as a function of its characteristics.

Fig. 17 is a view in cross-section of a servo-mechanism for the opening device of Fig. 16.

Fig. 18 is a cross-section through XVIII—XVIII of Fig. 17.

Figs. 19, 20 and 21 show the succession of the movements of extraction.

Fig. 22 is a plan view of the mechanism for removing the bag after its extraction.

Fig. 23 is a cross-section of a distributor having rotary slide-valves.

Fig. 24 is a view in elevation of a portion of Fig. 23.

Fig. 25 is a longitudinal cross-section of a lifting-jack.

In the example of embodiment of the invention shown in Figs. 1 and 2, the machine includes a lever 1 fixed to a shaft 12 which rotates in bearing $p$ mounted on the framework 7. This lever 1 is actuated by a double-acting hydraulic jack 9 which is pivoted at 8 around a horizontal axis on the frame 7, and is provided with a piston 10, the rod of which is pivoted at 11 on the lever 1.

A lever 2 is pivotally mounted at $m$ around a horizontal pivotal axis which is fixed to the lever 1 and is actuated by a double-acting hydraulic jack 5, pivoted at 6 on the frame 7 and provided with a piston 4, the rod of which is pivotally mounted at 3 on the lever 2.

This lever 2 carries a further lever 16 to which it is pivoted at 17 about a horizontal axis. The lever 16 is applied against a small plate 67 fixed to the lever 2 by a pneumatic single-acting jack 68 which is pivoted at 66' to the extremity 66 of the lever 2 and the piston 69 of which carries a rod articulated at 70 on the lever 16 (see also Fig. 4). An air supply inlet 68' ensures the maintenance of a permanent pressure on the piston 69.

The other extremity of the lever 16 in which a hollow portion is formed at 71, carries movable jaws 74 and 75 which are retained and controlled by cheeks 77 and 76 pivotally mounted at 73 and 72 on the lever 16 (see also Fig. 3).

These cheeks are actuated by spring-loaded crank-arms 87 and 81 to which they are pivoted at 78 and 79, the crank-arms being shown on a greater scale in Figs. 5 and 6. Both these crank-arms can vary in length (the crank 81 can increase and 87 can decrease) when a relatively small force is applied to the jaws 74 and 75 which tends to force them apart by pivoting about their axes of rotation 72 and 73. To this end, the body 89 of the crank-arm 87 slides on a rod 87' thus compressing a spring 86, whilst the body 81' of the crank-arm 81 slides along the rod 83 until a sliding tube 85 comes up against a ring 83' provided for that purpose on the rod 83.

The extremities 82 and 91 of the crank-arms are pivoted on the axes 65 and 64 (see also Fig. 7) which are fixed to cheeks placed one on each side of the axis 92 of a lever 61. This axis 92 is carried by a lever 16 which is made up of two sheets of steel $t$ and $t'$ to form a cheek, the sheets being joined together by the plate 93.

The lever 61 is actuated by a double-acting hydraulic jack 58 which is pivoted at 58' on the lever 16 and the piston 59 of which is fixed to a pivoted rod hinged at 60 on the extremity of the lever 61.

The action of the jack 58 which is applied, through the intermediary of the mechanical connection which has just been described, on the jaws 74 and 75, displaces these jaws simultaneously and symmetrically.

The admission and the evacuation of oil under pressure from the jacks 5 and 9 are effected by means of distributors similar to rotary slide valves of a standard type 18 and 19 (see Figs. 1, 23 and 24). The body of the distributor 18 which is fixed to the frame 155 carries two side-plates $f$ and $f'$ through which pass the shafts 135 and 138 which are respectively fixed to the rotary coaxial slide-valve 136 and 137.

The slide-valve 136 is connected to a pinion 18' by a spring connection consisting of a tension spring 132 connecting the levers $m$ and $m'$ which pivot about axes 130" and 130' which are fixed to a disc 130A fixed to the shaft 130 of the pinion 18'. This spring connection enables the force applied to the shaft 135 to be limited. A pinion 18" is keyed directly on to the shaft 138.

The oil supply arrives at $a$ and through suitable orifices and passages, passes through the orifices $c$ or $d$, the oil return being made by $b$. The relative position of the slide-valves 136 and 137 determines whether the admission is made through $c$ or $d$.

With the levers 1 and 2, which from now on will be known as "driving levers" are associated "guide levers" which are smaller and are arranged in such a way that at every instant the corresponding levers are very nearly parallel to each other, with a certain allowance for inaccuracies of the correspondence-control. The guide levers are made up of a lever 46, generally similar to the lever 1, and by a lever 47 similar to the lever 2, the driving levers 1 and 2 being respectively controlled by the guide levers 46 and 47 by means of suitable connections, an example of which is shown in Figs. 1 and 15.

The movement of the lever 1 is transmitted to a pinion 42 through a crank-arm 40 hinged on a finger 14 which is keyed to the shaft 12 to which the lever 1 is secured.

The movement of the lever 2 is transmitted to a pinion 30 through a crank-arm 26 pivoted on a finger 15' which pivots about the shaft 12 and carries an extension 13 in a different plane which permits its pivotal action on a crank-arm 13' hinged on the other hand to the lever 2.

The guide levers 46 and 47 which co-operated with the driving levers 1 and 2 are connected to the distributors 18 and 19 by the following means:

The lever 46 pivoting about an axis $g$ is connected to a pinion 43 by a crank-arm 41, whilst the lever 47, which is hinged to the extremity of the lever 46, is connected to a pinion 25 by a crank-arm 48 connected to a finger 45 which pivots about the same axis $g$. This finger 45 carries an extension 44 by means of which it can be attached to a crank-arm 39 articulated on the pinion 25.

The rotation of the pinions 43 and 25 is obtained either by the movements of the guiding levers 46 and 47 through the mechanism described above or by cams 29 and 29′ mounted on a shaft 122, the rotation of which is effected by a motor-reducer group 38 and 37, the transmission being effected through a gearing 36—34 and a chain 35.

In actual fact, these cams 29 and 29′ actuate levers 27 and 32 which are provided with rollers 28 and 31 and are loaded by the springs R and R′ which hold the rollers in contact with the cams. The connections between the levers 27 and 32 on the one hand, and the pinions 25 and 43 on the other hand, are carried out by means of an elastic mounting which can be seen in Figs. 13 and 14. This mounting consists of two levers 124 and 124′ which are pivoted about axes r and r′ which are fixed to the pinion 43. A tension spring 127, the ends of which are fixed to the levers 124 and 124′ forces these two levers to come together until the stop members 125 and 125′ come into contact with the lever 32.

A rod 128 which is fixed to the pinion 43 acts as a stop to the levers 124 and 124′ when the movement of the lever 32 is such that the pinion 43 does not turn through the same angle as this latter. In fact, whilst normally the rotation of the lever 32 would produce rotation of the pinion 43 as a result of the force applied to one of the stop members 125 or 125′, it may happen that the pinion is not able to follow this movement. In this case, the lagging of the movement between 42 and 43 is made possible by the relative movement which can take place between the levers 124 or 124′. A similar description may equally well be applied to the movement of the pinion 25.

Fig. 13 shows the details of the assembly:

A shaft 123 rotatably mounted in a bearing 33 carries the pinion 43. The lever 32 is mounted freely on the end of this shaft 123;

A shaft 122 rotating in the bearing 118 and 118′ is fixed to the cams 29—29′ and 119—120—121. These last three cams serve to operate small electric contactors (not shown) which are intended to operate at a given moment;

An electrically operated valve 161 (Fig. 1) which controls the distribution of the oil under pressure for the jack 58;

A similar valve for the jack 152 which will be described later;

The stopping of the motor 38 when the cam shaft 122 has made one complete turn.

These controls, which are quite standard, will not be described.

The edge of the pneumatic tyres to be treated are opened out from each other by means of two series of jaws; one fixed series carried by the frame 139 and one moving series carried by a support or moving frame 94 which is suspended from a trolley 116 which rolls along horizontal guides 143 (Figs. 1 and 9).

The description of the jaws which will be given in connection with Fig. 9 as far as concerns the moving frame, is the same as for the jaws on the fixed frame 139.

The frame 94, which is hollow and vertical, carries a certain number of radial slide-rails, each of which is associated with a jaw 117, the shape of which is shown in Fig. 12. There may be any desired number of these slide-rails, of which four have been shown in the example in the drawing.

These jaws 117 are fixed to a slide-block 96 which is guided by the members 101 and 101′ fixed to 94 by plates 102. A toothed rack 97 provided on the slider 96 engages with a pinion 98 which is keyed on to a shaft 99 (see also Figs. 10 and 11) which rotates in bearings fixed to the plates 102 and 102′. A pinion 100 keyed to the shaft 99 is driven by a chain 95 which travels inside the hollow frame 94. This chain 95 has its two ends fixed to a trolley 106 fitted with rollers 105 and 105′ rolling in a guide 107. The trolley 106 carries a cheek 103 in which is hinged at 104 the extremity of the rod of the piston 109 of a double-acting jack 108 fixed at 110. The chain 95 thus drives simultaneously the jaws 117 however many there may be.

The frame 94 is suspended by a rod 112 which rotates on a ball thrust bearing 113 which retains a saddle 111 fixed to the frame 94. A pneumatic jack 141 exerts, through its shaft 140, a thrust on the trolley 116 which causes the frame 94 to move (see Fig. 1).

The driving fluids acting on the similar jacks 108 and 108′ associated with the moving frame 94 and the fixed frame 139 (Figs. 1 and 9) which operate the jaws 117, are distributed to these double-acting jacks by distributors 163 and 162 respectively.

These distributors 163 and 162 are of a standard type, having a solenoid which actuates a distribution slide-valve. The electrical circuits of the distributors are opened and closed by hand-switches. In addition, the distributor 163 is under the control of an electric contactor operated by a cam 126 which is fixed to the shaft 122 (see Fig. 13). (The electrical connections between these contactors and the distributors are of quite common use and well-known and are not shown on the drawings, on which the switches and contactors are also not shown.)

Figs. 1, 16, 17, 18 and 25 show the operation of the mechanism for opening apart the frames 94 and 139. These frames move away from each other by a variable distance M under the action of the thrust of two horizontal rods 148 and 147 moved by double-acting hydraulic jacks 149 and 146.

The automatic determination of the distance M between the frames as a function of the diameters d and D which are characteristic of the tyres, is carried out by the following members.

A cranked lever 164 pivoting about a horizontal axis fixed to a support 165 is controlled by a pneumatic jack 164′ which brings a plate 164″ at the end of the lever 164 in contact with the tyre E carried by the jaws of the fixed frame 139. The position of the branch 166 of the lever 164 thus depends on the diameter D.

The position of the pivot 104 of the jack 108 which serves to separate the jaws 117 from the frame 139 depends on the diameter d of the tyre E. Now the member which carries the pivot 104, under the thrust of the piston of the jack 108, causes a certain displacement of a lever 172 which pivots about a horizontal axis fixed to a support 173. Finally, the position of the lever 172 depends on the diameter d of the rim of the tyre E.

Thus, the position of a crank-arm 167 is under the double control of the diameters d and D, since it is pivoted, on the one hand at 171 to the extremity of the lever 166, and on the other hand, at 169 to a crank-arm 206 actuated by the lever 172.

A crank 170 is pivoted on to the crank-arm 167 between the axes 169 and 171. This crank 170 controls the levers 209 and 187 by the intermediary:

Of a lever 176 which is fixed to a shaft having a vertical axis ZZ′ rotating in a support 175;

Of a right-angled lever fixed to this shaft and of which one of the arms 178 actuates a crank 179 fixed to the lever 209, whilst the other arm 177 actuates a crank 180 fixed to a lever 181;

Of a crank 186 secured to this lever 181 and to the lever 187.

The members which control the movements of the hydraulic jack 146 are as follows:

A distributor 203 having a slide-valve 202 of a standard type acted upon by thrust from the rod 204′ of a piston-type pneumatic push-button 204. This distributor 203 controls the distribution of oil to the jack 146;

A compression spring 201 mounted between a support 200 and the extremity of the slide-valve 202;

A rod 198 sliding in a fixed guide 199 and carrying a swingle-tree 192 to which are attached the cranks 193 and 191;

A lever 194 attached to the crank 193 rotating about an axis maintained by a vertical support 195;

A finger 196 carried by the extremity of the lever 194 and co-operating with a slot 196';

A shoulder 147' on the rod 147 of the jack 146 which pushes this finger 196;

The crank 191 is attached to a lever 190 fixed to a vertical shaft 188 which is supported by bearings 189 and 189' and is fixed by its upper portion to the lever 187;

A tension spring 197 acting on the lever 194.

The members which control the movements of the hydraulic jack 149 are as follows:

A distributor 219 of the usual slide-valve type, the shaft 217 of which is moved by a small pneumatically-operated push-button 218. This distributor 219 controls the admission of oil to the jack 149;

The rod 217 is in contact with one extremity 216 of a lever 214 which pivots about a horizontal axis fixed to a support 215;

The other extremity 213 of the lever 214 has applied to it the thrust of a horizontal shaft 211 sliding in a guide 212;

The shaft 211 is connected to a lever 209 by means of a hinged cheek 210;

The lever 209, controlled by a spring 221 and carrying a double cheek 222 which thrusts a member 225 sliding on a rod 224 by the intermediary (see Figs. 17 and 18) of bearings 222' provided with rings p';

The horizontal rod 224, sliding in the fixed guide 212 carries at its extremities a stop ring 224', on the one hand, and a lever 227, on the other hand;

The lever 227 is fixed at 148' to the extremity of the rod 148 of the jack 149.

If reference is made to Figs. 1 and 2, it is seen that the tyre E, held by the jaws of the frames 94 and 139, at a variable distance apart M, has its vertical equatorial plane WW' which occupies a variable position as a function of M with respect to the fixed frame 139. It is thus necessary that the plane VV' at an equal distance from the jaws 74 and 75 should coincide with the plane WW' when the bag X is gripped (Fig. 2). This means that the driving lever 1 will occupy a variable position (at the moment of gripping the bag) as a function of the variable separation distance M. This automatic setting in place of the plane VV' in WW' is carried out by means of the following members:

On making reference to Figs. 1 and 16, it will be seen that the guiding lever 46 is provided with a screw stop 186 which can come up against a plate 185 fixed to a lever 184. These two levers 46 and 184 pivot freely around the horizontal axis g;

A crank 183 attached to the upper extremity of the lever 184 and to the arm 182 of the bent lever 181.

When the bag X has been gripped, the driving lever 2 (see Figs. 1 and 19) must cause the lever 16 to come down to its lowest possible point in order fully to disengage the bag from the tyre. Now, the displacement of the lever 16 which carries the jaws, is limited by this lever coming up against the edges of the tyre, the diameter of the rim of which is d. This means that the downward movement of the lever 16 must have a variable amplitude as a function of d.

There is here an example of the operation of "casual circumstances" which was referred to in the preamble.

The means which permit of the lever 2 being given a suitable movement in order to pull the bag as low as possible without coming into contact with the edges of the tyre are as follows:

The guide lever 47 carries at its extremity a roller 49 which, in certain positions, comes up against a profiled stop 50, the position of which depends on the value of the diameter d. This dependence is obtained by attaching a vertical slider 51 which carries the stop member 50 and slides in the fixed guides 52 and 53, to the lever 172 (see Fig. 16) by the intermediary:

Of a lever 55 coupled to a crank 54 pivoted on the slider 51;

Of a lever 56 fixed to the lever 55 and coupled to a crank 57;

By a right-angled lever 207 pivoting about a vertical axis and coupled by each of its arms to the cranks 57 and 205. The latter is pivoted to the lever 172.

Thus, when the edges of the tyre are held in the frame 139 by the four jaws 117, the plate 174 at the free extremity of the lever 172 occupies a position which depends on the diameter d of the rim and, as a result, there must be a determined position (as a function of d) for the stop member 50.

The control of all the hydraulic pistons may be effected by a very standard comprising (Fig. 1) a motor 156 driving a pump 157 (for example of the type having variable output and constant pressure), a discharge flap-valve 158, an oil chamber 159 and a filter 160, the whole with a network of piping connecting the jacks described to the various distributors, to the oil tank and to the pump. This assembly, which is known in itself, will not be described.

In Figs. 20 and 22, the bag will be seen to occupy the position X" at the moment at which, by the action of the levers 1 and 2, it is placed on a kind of pivoting fork 150, the arm 150' of which is movable around a vertical axis 151 carried by the fixed frame 143 (see also Fig. 1).

This fork is moved by the double-acting pneumatic jack 152, the piston rod of which is pivoted at 153 to an extension 150" of the arm 150' which carries the fork 150. This arm 150' turns under the action of the jack 152 so as to pass from the position U to the position U', the effect of which is to take out the bag from the machine in order to bring it from the position X" to the position X"'.

The machine which has just been described operates in the following way:

The moving frame 94, being at a distance from the fixed frame 139 (see Fig. 1), the tyre is brought on to an elevator 145 which raises it up to the level of the jaws 117. The tyre being slightly inclined, the jaws 117 of the fixed frame 139 are opened by acting on the control of the distributor 162. The jaws 117 insert themselves between the tyre and the bag.

The moving frame 94 is pushed up against the tyre by means of the handle P and by operating the distributor 163, the jaws 117 of the moving frame 94 are inserted between the tyre and the bag.

Air under pressure is admitted to the jack 164' (Fig. 16) which applies the feeler member 164" against the tyre. At this moment, the cranks 179 and 191 occupy a position which depends on the interior and exterior diameter d and D.

Compressed air is admitted to the pushes 204 and 218 (Fig. 16). The slide-valves 203 and 219 operate and the jacks 149 and 146 are supplied with oil which causes the rods 148 and 147 to travel out and this has the effect of driving all the members already described between the jacks 149 and 146 and the distributors 219 and 203. The lever 214, under the thrust of 211 closes the admission by acting on 217. The lever 194, acting on 198, closes the admission of 203. The travel of the rods 148 and 147 of the two servo-motors is thus limited as a function of d and D. There results from this a separate M between the frames which is fixed by d and D.

The motors 156 for the pump and 38 for the servo-mechanism, are started up. The cams 29 and 29' rotate and drive the rotating distributors 18 and 19 and the guiding levers 46 and 47.

The oil under pressure being admitted to one face of the pistons 19 and 4, the levers 1 and 2 are set in motion as well as the cranks 26 and 40. These cranks, in acting on the pinions 30 and 42 re-close or reduce the admission of oil to the rotary distributors 18 and 19, if the movement of the levers 1 and 2 becomes more rapid than that which is defined by the cams 29 and 29'.

The profiles of these latter cams are fixed in the following manner:

On referring to Fig. 19, there will be seen a curve Z, which is the trajectory of the central point equidistant from the pivotal points of the jaws 75 and 74 carried by the lever 16. The curve Z is characterised by six interesting points:

Point I: Position of the end of the insertion of the jaws 74 and 75 between the bax X and the tyre E.
Point II: The lowest position to which the bag is pulled.
Point III: Position of the end of extraction of the bag.
Point IV: Intermediary position enabling the putting in place of the fork 150 (Fig. 20).
Point V: Position of placing of the bag at X" on the fork 150.
Point VI: Position of rest enabling the removal of the bag at X" and X'" (Figs. 22 and 20).

This curve Z may be laid down in advance and traced on a vertical sheet placed in position on the machine. To this end, the cams 29 and 29' are replaced by discs of thin material and the levers 27 and 32 have their extremities provided with tracing points, fixed instead of the rollers 28 and 31, the points being located in the axis of these rollers.

The motor 38 is set in motion and the driving levers 1 and 2 are put in operation by manually operating the guide lever 47. This hand operation has the effect of tracing the profile of the cams 29 and 29' by the action of the cranks 39 and 41 which drive the levers 27 and 32, which are temporarily provided with tracing points in place of their rollers.

The profiles thus obtained are cut out and in this way, the cams 29 and 29' may be traced.

These profiles may also be traced-out beforehand and without the aid of the machine.

When the tyre is put in position on the frames 139 and 94, the contact of the jaws 117 with the edges of the tyre enables the measurement of the diameter $d$ to be made whilst the contact of the blade 164" of the arm 164 with the exterior of the tyre enables the measurement of the diameter D to be completed.

Compressed air is admitted to the pushes 218 and 204 and the rods of the jacks 149 and 146 separate the moving frame 94 from the fixed frame 139 by a distance M which is limited and controlled by the correspondence-control mechanism operated by the crank 170 and the sequences of movements already described.

In this way, there is obtained an automatic control of the trajectory of the jaws (curve Z) as a function of the dimensions of the tyre.

The extraction of the bag is carried out in the following manner:

A rotation of the cams 29 and 29' causes movement of the levers 1 and 2 and the curve Z is described by the extremity of the lever 16.

The jaws 74 and 75 come into contact by their extremities $b$ and $b'$ with the bag X as they push themselves between the internal walls of the tyre E and the external walls of the bag X.

The separating movement of the jaws 74 and 75 is carried out using only very little effort since the reaction of the extremities $b$ and $b'$ of the jaws is limited by the springs 84 and 86 of the crank of these jaws.

The bag is gripped by the jaws 75 and 74 when the oil under pressure is admitted to the piston 59 (Figs. 8 and 2) by the action of the distributor 161.

In order to grip the bag, it is necessary that the plane VV' equidistant from the jaws should come into the plane WW' of the equator of the tyre E (Fig. 1). This plane WW' has a position which depends on the separation of M, and it has been seen that at the moment in which the frames are separated by M, the lever 184 occupies a fixed position which is a function of M. The result of this is that the stop member 186 comes up against 185 and limits the movement of the guide lever 46 (Figs. 16 and 1) and thus of the driving lever 1. The jaws thus come into the mean plane WW' of the bag to be gripped.

The jaws are lowered down to the position II of the trajectory Z without the arm 16 coming into contact with the edges of the tyre, since the stop member 50 which is located in a position dependent on the diameter $d$ of the rim, limits the movement of the lever 47 downwards. This results in a limitation of the downwards movement of the lever 2 and therefore of the lever 16.

The following of the curve Z brings the bag in place on the fork 150, which has been put in position by the jack 152. The jaws 75 and 74 being open, leave the bag free to be placed on 150 at 154 (position V) and the fork 150 turns from $u$ to the position $u'$ carrying the bag with it when the lever 16 is at the position VI.

In order to remove the tyre, the distributor 165 acts so that admission to the jack 108 of the moving frame 94 causes the jaws 117 to close in, in order to free them from the edges of the tyre.

As soon as these jaws cease to be in contact with the tyre E (Fig. 1), the rod 140 of the jack 141 pushes the trolley 116 and the frame 94 moves away. The distributor 162 is now actuated to free the jaws of the fixed frame 139 from the tyre and this latter is supported by the elevator 145 to be placed on the ground and removed.

It will be quite clear that modifications may be made to the forms of embodiment which have been described above, in particular by the substitution of equivalent technical means, without thereby departing from the spirit or the scope of the present invention.

What I claim is:

1. A machine designed for the extraction of vulcanising or heat-treatment bags from pneumatic rubber tyres, said machine comprising an articulated lever system provided with gripping members and constituting a mechanical arm, said lever system including two articulated levers, one of which pivots about a fixed axis while the other carries said gripping members, a second articulated lever system including two further articulated levers, one of which pivots about a fixed axis, separate power-actuated devices for selectively operating and controlling the angular movement of each of the said two articulated levers of said first articulated system, control means for independently controlling the power supply to each of said power-actuated devices, and means for controlling said control means in dependence on the movement of each lever constituting the said second articulated lever system, whereby the desired cycle of movement traced by said second articulated lever system and required for the extraction of the said bag, is repeated by said articulated lever system under power-operation.

2. A machine as claimed in claim 1, wherein said control means includes valve means.

3. A machine designed to automatically extract vulcanising bags from pneumatic tyres, said machine comprising an articulated driving-lever system including a first driving-lever, of which one extremity is pivoted about a fixed axis and the other extremity pivotally attached to one extremity of a second driving lever, a third lever pivotally mounted on said second driving lever at a point intermediate its two extremities, the free end of said third lever carrying a pair of pivotally-mounted jaws adapted for operation by power means including a spring-loaded compound lever system, power means for controlling the angular movement of said first driving-lever, including a double-acting hydraulic jack, the free extremity of the piston-rod of said jack being pivoted on said first driving-lever and the body of said jack pivoted about a fixed axis, power means for controlling the angular movement of said second driving-lever, including a second double-acting jack having its free piston-rod extremity pivotally attached to said second driving-lever and its body pivotally mounted on a fixed axis, rotary slide-valves for controlling the fluid-pressure supply independently to each of said jacks, a double-pinion system adapted to control each of said rotary slide-valves independently, a crank-rod pivotally mounted at one extremity on one of the pinions of one said double-pinion system, the other extremity being pivoted to said first guide lever, a crank-rod pivotally secured to the other pinion of said double-pinion, the other extremity of said crank-rod being pivoted on said first driving-lever, a second pair of crank-rods pivotally attached to the two pinions of the other double-pinion system and respectively to said second guide-lever and said second driving-lever, whereby the movements of said guide-levers are caused to be reproduced and amplified in said driving-levers for the purpose set forth.

4. A vulcanising-bag extracting machine in accordance with claim 3, comprising a cam-shaft mounted between said double-pinion systems, two cams mounted on said shaft, means for rotating said shaft, an arm elastically mounted with respect to that pinion of said double-pinion system which is coupled to said first guide-lever, the extremity of said arm carrying a roller associated with the profile of one of said cams, a second elastically-mounted arm associated with the guide-lever pinion coupled to said second guide-lever, a roller on the extremity of said second arm and associated with the profile of the other of said cams, whereby the trajectory described by the said gripping jaws may be either pre-determined by the contours of the two said cams or by movements imparted manually to the free extremity of said second guide-lever.

5. A machine in accordance with claim 4, in which the said elastically-mounted arms are provided at their extremities with tracing scribers mounted in place of, and on the same axis as, the said rollers, the said cams being replaced by discs of thin material, rotation of the said discs by the said means for rotating said cam-shaft, coupled with a manual operation of the free extremity of said second guide lever over a desired cycle of motions, causing curves to be traced on said two discs, said curves being used as the basic profiles for two cams which, when mounted on said cam-shaft and associated with rollers again mounted on the extremities of said arms, repeat automatically and impress on said guide-levers, and thence through the correspondence-control system to the prehensile jaws of said driving-lever system, the same cycle of motion as carried out manually on said second guide-lever during the cam-contour recording operation.

6. A vulcanising-bag extracting machine in accordance wtih claim 3, in which the said pair of hinged jaws is actuated by means comprising a double-acting jack hingedly mounted on said third lever of said driving-lever system, the free extremity of the piston rod of said jack being pivotally fixed to one end of a toggle-lever pivotally fixed to said lever at a point adjacent the end of said toggle-lever, a rod spring-loaded against compression and pivotally mounted on said toggle-lever close to its pivotal fixation, said rod being pivoted by its other extremity to a rotating cheek carrying one of said jaws a second rod spring-loaded against tension and pivotally mounted on said toggle-lever on the opposite side of its pivotal fixation, said second rod being pivoted by its other extremity to a second rotating cheek carrying the other of said jaws, whereby very little effort is required to open said jaws and a very strong effort to close them.

7. A machine in accordance with claim 6, in which the said spring-loaded rods operating the hinged jaws are each provided with a stop member which limits the respective lengthening or shortening of the said rods, thereby limiting the degree of closure of the said hinged jaws.

8. A machine in accordance with claim 3, comprising devices for measuring the position and the external and internal (beaded-edge) diameters of the said pneumatic tyre, said device for measuring the external diameter comprising a feeler member constituted by a pivoted cranked lever, one extremity of which is brought into contact with the outer surface of said tyre, said second device for measuring the beaded-edge diameter of said tyre comprising a plurality of automatically adjustable power-operated members spaced regularly apart around the periphery of said beaded-edge, the operation of the two aforesaid measuring and locating devices being linked with the articulated system of the said driving-lever assembly and varying the position of movable stops which limit the travel of said driving levers and thereby modify the trajectory of said prehensile jaws to suit the dimensions of the tyre from which the vulcanising-bag is to be extracted.

9. A machine in accordance with claim 8, in which the variable separation between said moving vertical frame and said fixed vertical frame, is a function of the direction and length of travel of said second double-acting jack, the operation of said second jack being effected as a function of, and controlled by the position of the said two devices which locate and measure the external diameter and internal rim diameter of said pneumatic tyre.

10. A machine in accordance with claim 3, in which the beaded edges of the said pneumatic tyre are automatically opened out to facilitate the extraction of the said vulcanising-bag by an arrangement comprising a vertical fixed frame, a plurality of radially-disposed slide-rails on said frame, a like number of members adapted to slide in said slide-rails, said members terminating in jaws at their inward extremities, a toothed rack formed internally of the sliding portion of each said jaw member, a plurality of pinions pivoted on said frame and co-operating one with each of said toothed racks, a second pinion coupled to each of said first pinions, and an endless chain engaging with all said second pinions, said chain being moved by a double-acting jack, the piston-rod extremity of which is pivotally fixed to said chain, actuation of the jack causing simultaneous inward or outward displacement of all said sliding jaw members, a vertical moving frame suspended from a trolley adapted to move along a rail fixed to the frame of said machine, under the impulsion of a second double-acting jack controlling automatically the distance between said fixed frame and said moving frame, the moving frame being provided with automatically operated jaw members disposed and actuated in the same manner as those of said fixed frame, for the purpose set forth.

11. A machine in accordance with claim 3, in which at a point in the cycle of movement described by the said gripping jaws of the driving-lever system subsequent to the extraction of the vulcanising-bag from said pneumatic tyre, there intervenes a device for removing said bag from the machine, said device comprising a fixed runway, a trolley adapted to move along said runway and suspended therefrom, a horizontal member pivotally mounted on said trolley and about a vertical axis, a cradle comprising a pair of upwardly-curved members, said cradle being rigidly fixed to said horizontal member, means for displacing said trolley, including a double-acting jack carried under and fixed to said runway, means for swinging said cradle about the said vertical axis comprising a second double-acting jack, the arrangement being such that the cradle is advanced towards the bag at the moment of its extraction from the tyre by the said prehensile jaws which open to place the bag on said cradle, actuation of said second jack causing the said cradle and bag to be swung clear of the machine for removal.

References Cited in the file of this patent

UNITED STATES PATENTS

| | | |
|---|---|---|
| 1,535,382 | Taylor et al. | Apr. 28, 1925 |
| 2,069,189 | Taylor | Jan. 26, 1937 |
| 2,568,244 | McDonald | Sept. 18, 1951 |
| 2,668,983 | Strong et al. | Feb. 16, 1954 |